United States Patent
Zhou (10) Patent No.: US 10,800,307 B1
(45) Date of Patent: Oct. 13, 2020

(54) VEHICLE SIDE PILLOW ASSEMBLY

(71) Applicant: SHEN ZHEN STAND BY ME TECHNOLOGY LIMITED, Shenzhen (CN)

(72) Inventor: Zhiping Zhou, Hui Zhou (CN)

(73) Assignee: SHEN ZHEN STAND BY ME TECHNOLOGY LIMITED, Shenzhen (CN)

( * ) Notice: Subject to any disclaimer, the term of this patent is extended or adjusted under 35 U.S.C. 154(b) by 0 days.

(21) Appl. No.: 16/868,976

(22) Filed: May 7, 2020

Related U.S. Application Data (63) Continuation of application No. PCT/CN2019/084118, filed on Apr. 24, 2019.

(51) Int. Cl.
  *B60N 2/80* (2018.01)
  *B60N 2/882* (2018.01)
  *B60N 2/885* (2018.01)
  *B60N 2/90* (2018.01)

(52) U.S. Cl.
  CPC ..................... *B60N 2/99* (2018.02)

(58) Field of Classification Search
  CPC ........................................... B60N 2/99
  USPC ................................. 297/397, 398
  See application file for complete search history.

(56) References Cited

U.S. PATENT DOCUMENTS

| | | | | |
|---|---|---|---|---|
| 2,831,530 A * | 4/1958 | Chiopelas | ............... | B60N 2/882 297/397 |
| 4,114,948 A * | 9/1978 | Perkey | ................... | B60N 2/882 297/397 |
| 4,971,393 A * | 11/1990 | Maisenhalder | ........ | A47C 7/383 297/397 |
| 5,868,471 A * | 2/1999 | Graham | ................. | A47C 7/383 297/397 |
| 5,967,613 A * | 10/1999 | McKeever | ............. | A61G 5/121 297/397 |
| 6,220,668 B1 | 4/2001 | Scheffzuck | | |
| 6,935,695 B2 * | 8/2005 | Carta Gonzalez | ..... | A47C 7/383 297/397 |
| 7,207,630 B1 * | 4/2007 | Reynolds | ................. | A61G 5/12 297/397 X |
| 8,888,187 B2 * | 11/2014 | Albino | ................... | B60N 2/885 297/397 |

(Continued)

*Primary Examiner* — Rodney B White
(74) *Attorney, Agent, or Firm* — WPAT, PC (57) ABSTRACT

A vehicle side pillow assembly includes: a connection bar, two ends of which being disposed with first and second side pillows having opposite pillow surfaces; and first and second installation parts for installing the vehicle side pillow assembly onto two insertion rods of a vehicle headrest. The first and second installation parts are arranged in mirror symmetry and movably connected to the connection bar. The connection bar is disposed with several spaced engagement slots along an axial direction thereof. The first and second installation parts are respectively disposed with first and second engagement portions matching the engagement slots. The first and second engagement portions are capable of being engaged with or separated from the engagement slots, so that the first and second installation parts are fixed at a position corresponding to the insertion rods. The vehicle side pillow assembly is convenient to use and has the characteristics of being convenient for disassembly, installation and storage.

19 Claims, 8 Drawing Sheets

(56) References Cited

U.S. PATENT DOCUMENTS

| | | | |
|---|---|---|---|
| 9,616,789 B2* | 4/2017 | Arriola | B60N 2/882 |
| 9,701,231 B2* | 7/2017 | Arriola | B60N 2/882 |
| 9,855,874 B2* | 1/2018 | Sanchez | B60N 2/882 |
| 10,118,526 B1* | 11/2018 | Fan | B60N 2/874 |
| 10,618,442 B2* | 4/2020 | Zhou | B60N 2/0232 |
| 2007/0180623 A1 | 8/2007 | Stein et al. | |
| 2009/0058161 A1* | 3/2009 | Meert | B60N 2/882 |
| | | | 297/397 |
| 2012/0006870 A1* | 1/2012 | Proctor | B60R 11/02 |
| | | | 224/275 |
| 2012/0007405 A1* | 1/2012 | Kim | B60N 2/882 |
| | | | 297/397 |
| 2013/0068809 A1* | 3/2013 | Wang | B60R 11/02 |
| | | | 224/275 |
| 2015/0145307 A1 | 5/2015 | Arriola et al. | |
| 2018/0370398 A1 | 12/2018 | Chiang | |

* cited by examiner

VEHICLE SIDE PILLOW ASSEMBLY

TECHNICAL FIELD

The invention relates to the field of vehicle parts, and more particularly to a vehicle side pillow assembly.

DESCRIPTION OF RELATED ART

Compared with ordinary vehicle headrests, a vehicle side pillow assembly can provide a head support by sides for driving, especially for long-distance driving, and provide a short rest for the long journey. It can not only relieve the fatigue of riding, but also protect the head and neck of passengers in traffic accidents so as to reduce the injury in accidents.

As to the conventional vehicle side pillow assembly, an installation bar (also referred to as connection bar) is generally disposed with a rear cover, and by adjusting a spacing between insertion holes on the installation bar, the insertion holes are correspondingly placed onto insertion rods of a headrest of a corresponding vehicle seat, and then the rear cover and the installation bar are locked with screws, so that the vehicle side pillow assembly can be firmly installed on the vehicle seat. Such vehicle side pillow assembly that needs to be used with screws is complex in structure, difficult to install, inconvenient to disassemble, time-consuming and laborious.

Moreover, in order to ensure the stability of the vehicle headrest in bumpy conditions during driving, the installation bar and side pillows at two ends of the installation bar usually are integrally designed into one piece, while the vehicle headrest is generally large in volume and takes up a large space, so it is also a big problem to store when it is not in use.

SUMMARY

Accordingly, in order to address the problems of vehicle side pillow assembly being inconvenient to be installed and stored, there is a need of providing a vehicle side pillow assembly that can adjust the spacing of insertion holes without the help of external tools as well as can be easily installed without external tools.

In order to achieve the above objectives, an embodiment of the invention provides a vehicle side pillow assembly which adopts the following technical solution.

In particular, the vehicle side pillow assembly includes: a connection bar, two ends of the connection bar being disposed with a first side pillow and a second side pillow having opposite pillow surfaces; and first installation part and second installation part, configured (i.e., structured and arranged) for installing the vehicle side pillow assembly onto two insertion rods of a vehicle headrest. The first installation part and the second installation part are arranged in minor symmetry. The first installation part and the second installation part are movably connected to the connection bar. The connection bar is disposed with several engagement slots spaced from one another along an axial direction of the connection bar. The first installation part is disposed with a first engagement portion matching the engagement slots and engaged with any one of the engagement slots, the second installation part is disposed with a second engagement portion matching the engagement slots and engaged with any one of the engagement slots, and thereby positions of the first installation part and the second installation part with respect to the two insertion rods are fixed.

Beneficial effects: compared with the prior art, the vehicle side pillow assembly as proposed by the exemplary embodiment of the invention is convenient to use, and has the characteristics of being convenient for disassembly, installation and storage without the help of using tools or screws.

BRIEF DESCRIPTION OF THE DRAWINGS

In order to more clearly illustrate technical solutions of embodiments of the invention or the prior art, drawings used in the description of the embodiments or the prior art will be briefly described below.

The realization of objectives, functional features and advantages of the invention will be further described with reference to the attached drawings in combination with the embodiments.

DETAILED DESCRIPTION OF EMBODIMENTS

The technical solutions in the embodiments of the invention will be clearly and completely described below, with reference to the accompanying drawings in the embodiments of the invention.

Embodiment 1

Figure 1:
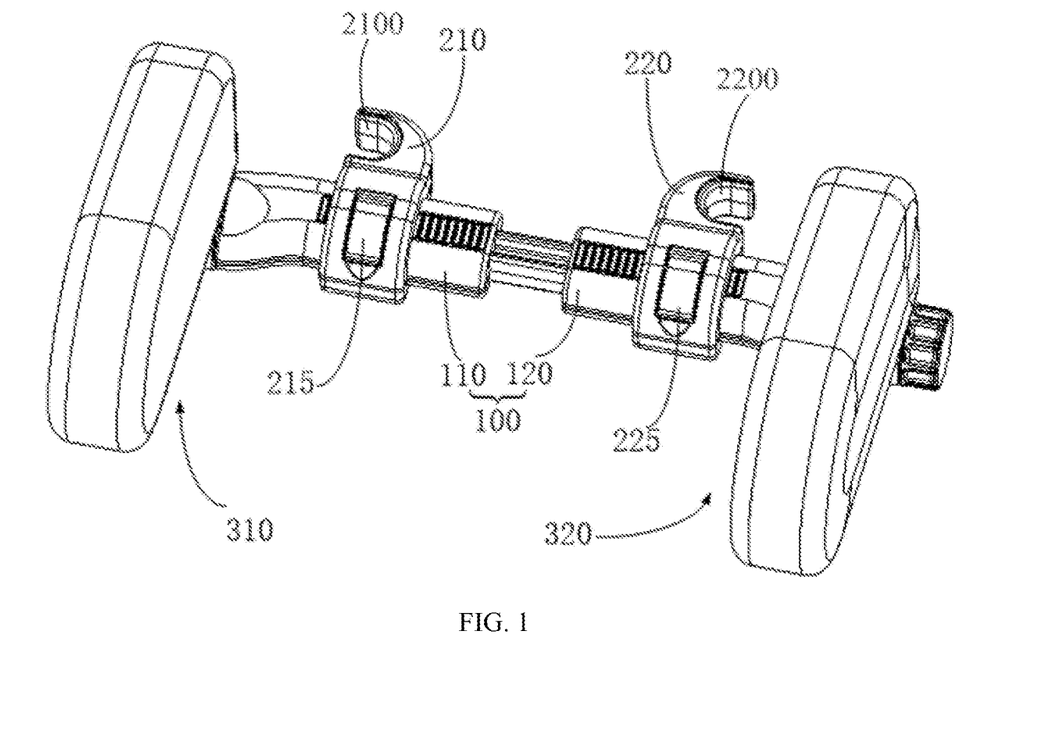
FIG. 1 is a schematic structural view of embodiment 1 of the invention.
Figure 2:
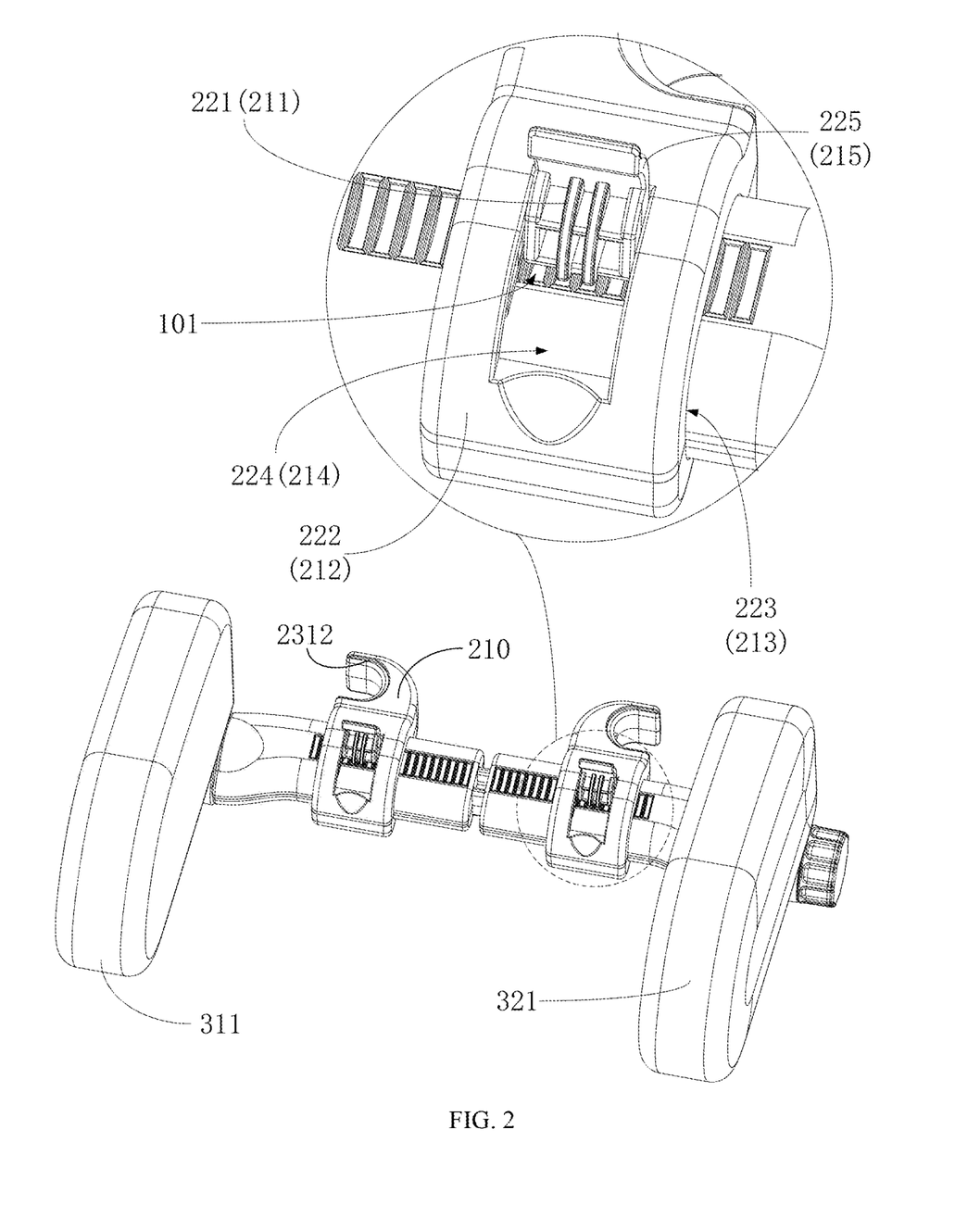
FIG. 2 is a schematic structural view showing an engagement portion according to the embodiment 1 of the invention.
Figure 3:
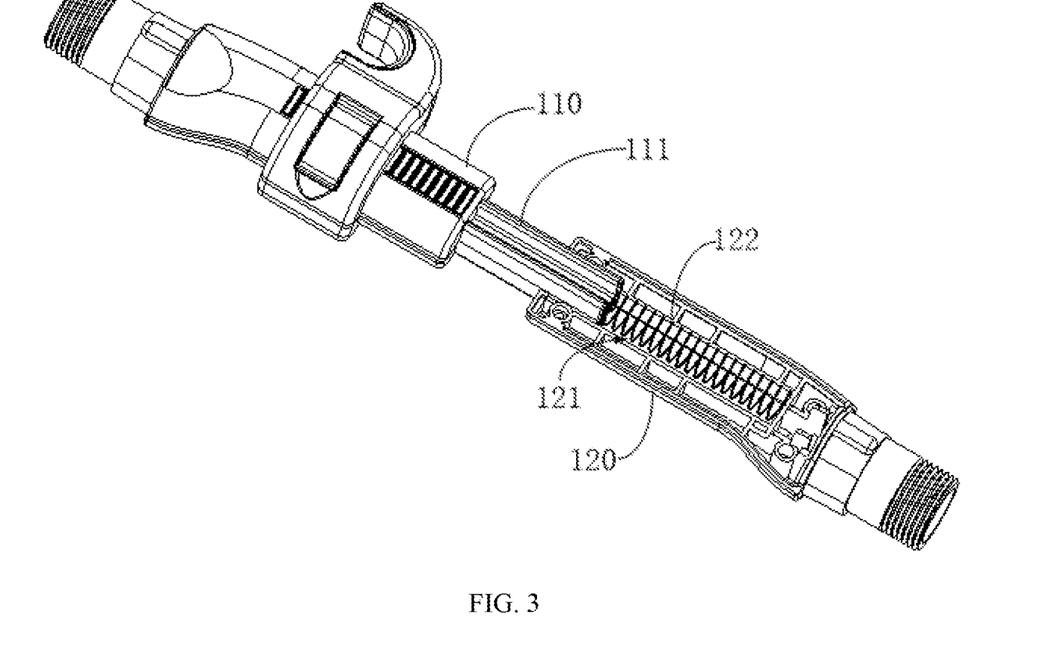
FIG. 3 is a schematic view of an internal structure of a connection bar in a stretching state according to the embodiment 1 of the invention.

Referring to FIG. 1, FIG. 2 and FIG. 3, a vehicle side pillow assembly according to the embodiment 1 includes: a connection bar 100, a first side pillow 310, a second side pillow 32, a first installation part 210 and a second installation part 220.

Figure 7:
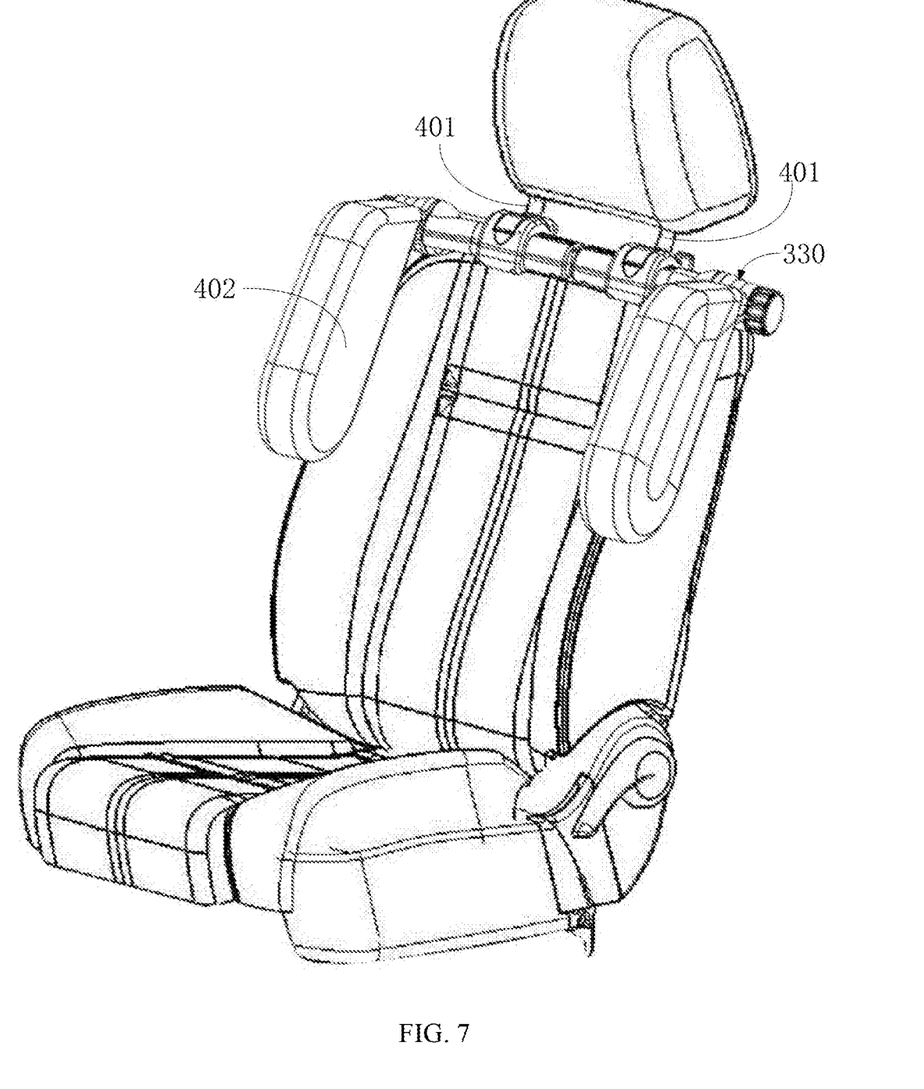
FIG. 7 is a schematic structural view of embodiment 2 of the invention.
Figure 8:
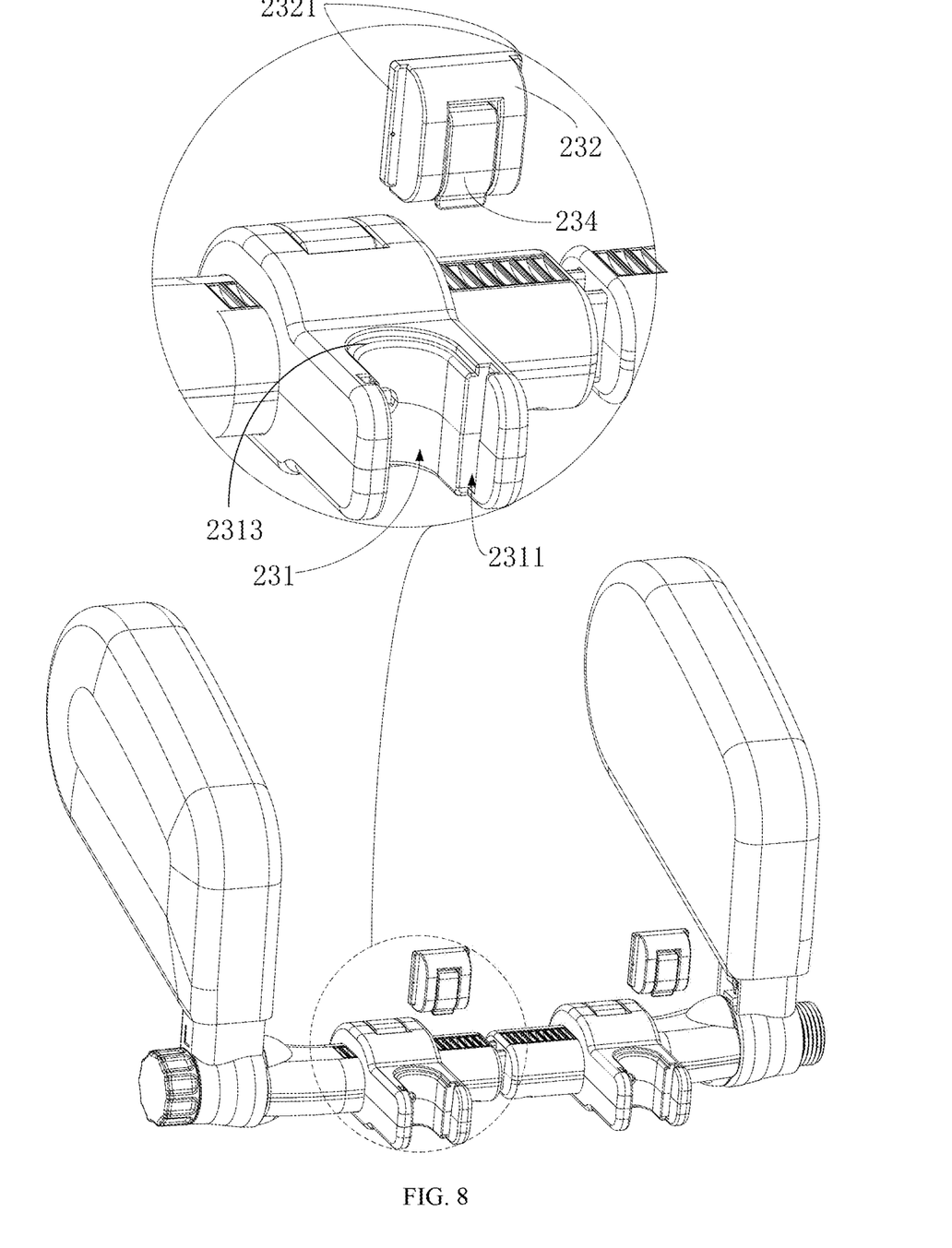
FIG. 8 is a schematic structural view of an installation part according to the embodiment 2 of the invention.

Two ends of the connection bar 100 are disposed with the first side pillow 310 and the second side pillow 320 having opposite pillow surfaces 402 (referring to FIG. 7), and further disposed with the first installation part 210 and the second installation part 220 for installing the vehicle side pillow assembly onto two insertion rods 401 of a vehicle headrest (referring to FIG. 7). The first installation part 210 and the second installation part 220 are arranged in minor symmetry. The first installation part 210 and the second installation part 220 are movably connected onto the connection bar 100. The connection bar 100 is disposed with several engagement slots 101 spaced from one another along an axial direction of the connection bar 100. The first installation part 210 is disposed with a first engagement portion 211 matching the engagement slots 101, the second installation part 220 is disposed with a second engagement portion 221 matching the engagement slots 101. The first engagement portion 211 and the second engagement portion 221 each are capable of being engaged with or separated from the engagement slots 101. The first engagement portion 211 and the second engagement portion 221 each can be engaged with any one of the engagement slots 101, so that positions of the first installation part 210 and the second installation part 220 with respect to the insertion rods 401 are fixed.

In an embodiment, combining with FIG. 2, the first installation part 210 further includes a first movable portion 212, and the first movable portion 212 is disposed with a first through hole 213. The second installation part 220 further includes a second movable portion 222, and the second movable portion 222 is disposed with a second through hole 223. The first movable portion 212 and the second movable portion 222 are sleeved on the connection bar 100 through the first through hole 213 and the second through hole 223 respectively. When the first movable portion 212 and the second movable portion 222 slide on the connection bar 100, the first installation part 210 and the second installation part 220 are brought to transversely move away from each other or close to each other. This embodiment enables the invention to adapt to distances of insertion rods 401 of vehicle seat headrest of different models. In use, the connection bar of the embodiment of the invention is placed toward the front of a vehicle seat, according to the seat headrests of different vehicle models, the first movable portion 212 and the second movable portion 222 are moved close to each other so as to be placed between the two insertion rods 401, the first installation part 210 and the second installation part 220 are put between the two insertion rods 401, and the position(s) of the first movable portion 212 and/or the second movable portion 222 are adjusted again, so that the first installation part 210 and the second installation part 220 are installed on the insertion rods 410 of the vehicle seat, and the vehicle side pillow assembly is installed on the headrest of vehicle seat consequently.

In an embodiment, as shown in FIG. 2, the first installation part 210 further includes a first receiving groove 214 disposed on a side facing toward the engagement slots 101. The first engagement portion 211 is received in the first receiving groove 214 and hinged with a sidewall of the first receiving groove 214. The first engagement portion 211 is capable of being engaged with or separated from corresponding one of the engagement slots 101 by hinging and rotating. A first toggle portion 215 extends from a side of the first engagement portion 211 facing away from the engagement slots 101. When the first toggle portion 215 is received in the first receiving groove 214, the first engagement portion 211 is engaged with one of the engagement slots 101; and when the first engagement portion 211 and the engagement slot 101 are separated from each other, the first toggle portion 215 and the first receiving groove 214 have a right angle formed therebetween. The second installation part 220 further includes a second receiving groove 224 disposed on a side facing toward the engagement slots 101. The second engagement portion 221 is received in the second receiving groove 224 and hinged with a sidewall of the second receiving groove 224. The second engagement portion 221 is capable of being engaged with or separated from corresponding one of the engagement slots 101 by hinging and rotating. A second toggle portion 225 extends from a side of the second engagement portion 221 facing away from the engagement slots 101. When the second toggle portion 225 is received in the second receiving groove 224, the second engagement portion 221 is engaged with one of the engagement slots 101; and when the second engagement portion 221 and the engagement slot 101 are separated from each other, the second toggle portion 225 and the second receiving groove 224 have a right angle formed therebetween. In use, moving upwardly the first toggle portion 215 and the second toggle portion 225, the first engagement portion 211 and the second engagement portion 221 are separated from corresponding ones of the engagement slots 101, at this time, the first movable portion 212 and the second movable portion 222 can be adjusted; and when the positions the first movable portion 212 and the second movable portion 222 are adjusted to target positions, moving downwardly the first toggle portion 215 and the second toggle portion 225, the first engagement portion 211 and the second engagement portion 221 are engaged with corresponding ones of the engagement slots 101 and thus the first movable portion 211 and the second movable portion 222 are fixed onto the connection bar 100. This embodiment facilitates the positions adjustment or fixing of the first movable portion 211 and the second movable portion 222 on the connection bar 100.

In an embodiment, the first installation part 210 and the second installation part 220 include a first engagement hook 2100 and a second engagement hook 2200 respectively (see FIG. 1). Openings of the first engagement hook 2100 and the second engagement hook 2200 respectively are facing toward the two insertion rods. The openings of the first engagement hook 2100 and the second engagement hook 2200 are facing away from each other.

Figure 11:
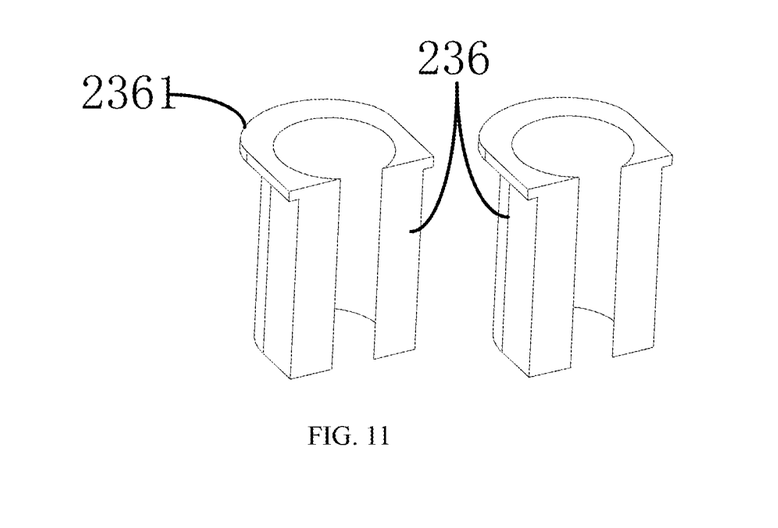
FIG. 11 is a schematic structural view of insertion rod sleeves according to the invention.

Preferably, as shown in FIG. 11, in order to fit the first installation part 210 and/or the second installation part 220 with the insertion rods of different models of vehicles and make the first installation part 210 and/or the second installation part 220 more firmly fixed on the insertion rods, the first installation part 210 and/or the second installation part 220 is/are disposed with an insertion rod sleeve(s) 236. In the following, the first engagement hook 2100 of the first installation part 210 is taken as an example, the insertion rod sleeve 236 is matched with the first engagement hook 2100. Referring to FIG. 1 and FIG. 2, an inner wall of the first engagement hook 2100 is disposed with an engagement groove 2312 near the opening of the first engagement hook 2100, the insertion rod sleeve 236 is disposed with an engagement protrusion 2361 (referring to FIG. 11) at a position corresponding to the engagement groove 2312. The insertion rod sleeve 236 is sleeved in the first engagement hook 2100 by the engagement between the engagement protrusion 2361 and the engagement groove 2312. Since the first engagement hook 2100 and the second engagement hook 2200 are arranged in mirror symmetry, the second engagement hook 2200 of the second installation part 220 will not be described in detail. An inner radius of the insertion rod sleeve 236 is smaller than an inner radius of the first engagement hook 2100, and in actual applications, insertion rod sleeves with different inner radii can be configured, so that the first installation part 210 and/or the second installation part 220 may be adapted to the insertion rods of different diameters. As a result, the vehicle side pillow assembly is convenient to use, flexible and universal.

In an embodiment, the connection bar 100 is a telescopic structure. The telescopic structure will be described in detail as follows. The connection bar 100 includes a first connecting rod 110 and a second connecting rod 120. An end of the first connecting rod 110 facing toward the second connecting rod 120 is disposed with a fixing block 111 extending therefrom, and an end of the second connecting rod 120 facing toward the first connecting rod 110 is disposed with a guiding slot 121 matched with the fixing block 111. A spring 122 is arranged in the guiding slot 121, and two ends of the spring 122 are respectively abutted against a sidewall of the guiding slot 121 and an end surface of the fixing block 111. The fixing block 111 is capable of being completely received in or protruded out of the guiding slot 121 to adjust the length of the connection bar 100. In use, the position(s) of the first movable portion 212 and/or the second movable portion 222 is/are firstly fixed, the first connecting rod 110 and the second connecting rod 120 are driven to close to each other by squeezing the spring 122, so as to place the first installation part 210 and the second installation part 220 between the two insertion rods 401. The spring 122 is released after the first installation part 210 and the second installation part 220 are aligned with the insertion rods 401, as a result, the first installation part 210 and the second installation part 220 are installed on the insertion rods 401 respectively. The first installation part 210 is located between the two insertion rods, so that the first installation part 210 is subjected to an elastic force of the spring 122 and an acting force of the insertion rod 401. The elastic force and the acting force both are applied onto the first installation part 210 and have opposite directions, so that the first installation part 210 can be fixed onto the insertion rod 401, and the vehicle side pillow assembly is fixed on a vehicle seat consequently.

Figure 4:
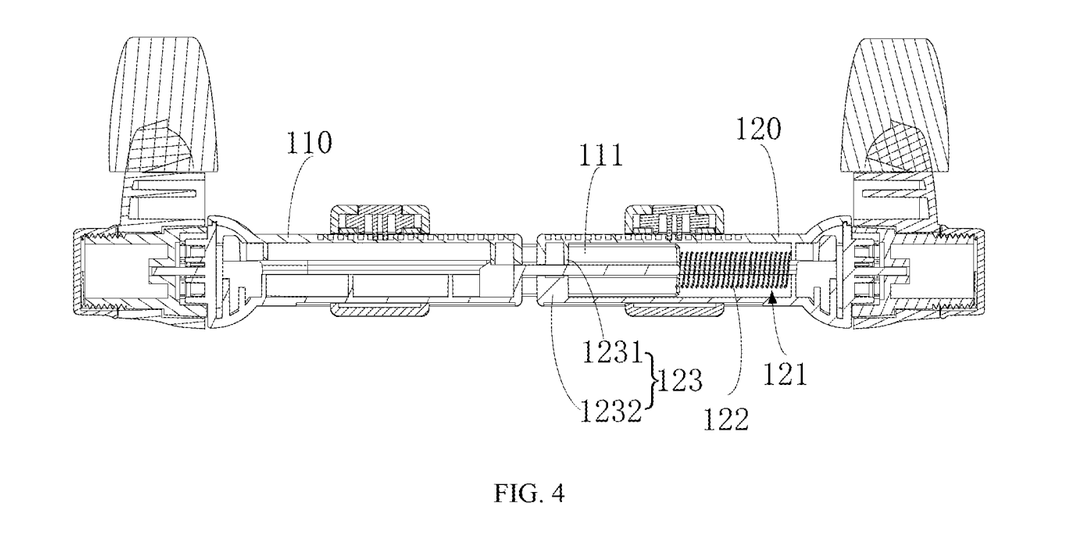
FIG. 4 is a schematic sectional view of the connection bar in a compression state according to the embodiment 1 of the invention.
Figure 5:
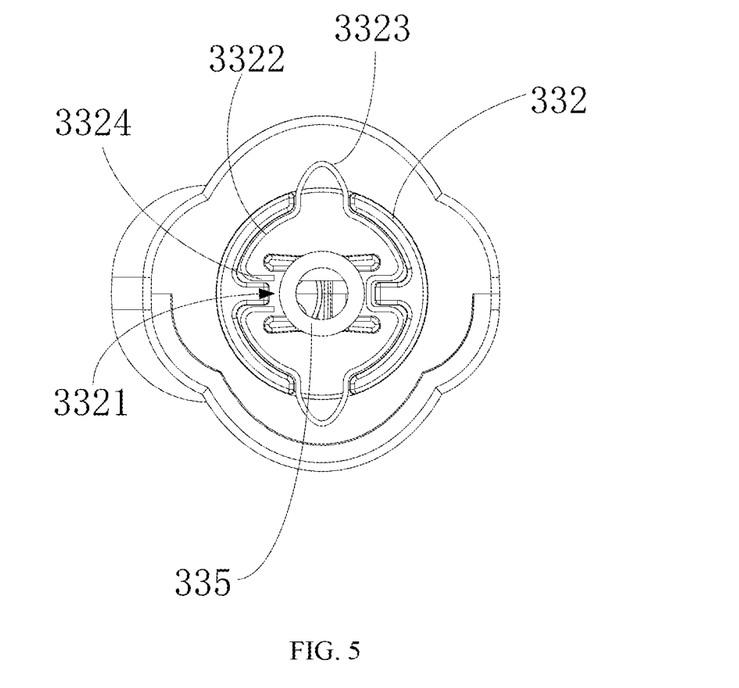
FIG. 5 is a schematic structural view of the connection bar according to the embodiment 1 of the invention.
Figure 6:
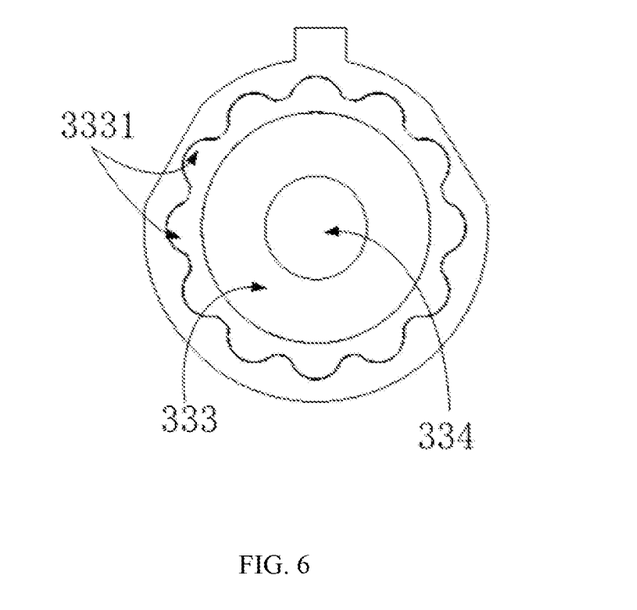
FIG. 6 is a schematic structural view of a connection portion according to the embodiment 1 of the invention.

In an embodiment, as shown in FIG. 4, a limiting block 123 is disposed at a notch of the guiding slot 121 near the first connecting rod 110. The limiting block 123 is concretely stoppers disposed oppositely to make the spring 122 be limited in the guiding slot 121. This embodiment makes the first connecting rod 110 and the second connecting rod 120 form a detachable structure, which makes the vehicle side pillow assembly easy to install and store.

In an embodiment, a cross section of the fixing block 111 is H-shaped. Correspondingly, the limiting block 123 includes first stopper 1231 and a second stopper 1232 oppositely arranged up and down. The first stopper 1231 and the second stopper 1232 make the opening of the guiding slot 121 be in H-shaped, so as to fit and receive the fixing block 111. This embodiment may enhance the stability when stretching between the first connecting rod 110 and the second connecting rod 120, and the H-shaped structure can make more stable in structure, more wear-resistant and improve the service life.

Combined with FIG. 1 and FIG. 7, the first side pillow 310 and/or the second side pillow 320 is/are movably connected with the connection bar 100. Specifically, the first side pillow 310 includes a first pillow portion 311 and a first connection portion 330. The first connection portion 330 includes a first annular groove 333 disposed on the first pillow portion 311, and the first annular groove 333 is arranged facing toward the first connecting rod 110. A sidewall of the first annular groove 333 is provided with several gear slots 3331. An end surface of the first connecting rod 110 is disposed with a first convex portion 332 matched with the first annular groove 333. The first annular groove 333 is engaged with the first convex portion 332 to make the first pillow portion 311 be rotatable around an axis of the first annular groove 333. The first convex portion 332 is provided with a spring sheet receiving groove 3321 having a mirror-symmetrical shape. The spring sheet receiving groove 3321 is disposed with a spring sheet therein, two ends of the spring sheet 3322 are provided with clamping portions 3324, the clamping portions 3324 are received in the spring sheet receiving groove 3321, a middle portion of the spring sheet 3322 is bent to form a protrusion 3323, and the protrusion 3323 protrudes out of an outside wall of the first convex portion 332 and abuts against the gear slot 3331. The center of the first convex portion 332 is provided with a first convex column 335, and the first annular groove 333 is disposed with a first column hole 334 matching the first convex column so as to make the installation more convenient. This embodiment can realize 360 degree rotation of the first side pillow 310, adjust the angle and position of the side pillow according to the height and use habits of different passengers, improve the sense of use, and can rotate the first side pillow to the rear of the vehicle seat when not in use, and thus without occupying space.

Since the first side pillow 310 and the second side pillow 320 are mirror symmetrical in structure, and thus the structure of the second side pillow will not be described in detail.

Embodiment 2

In addition, the invention also provides the embodiment 2. The difference between the embodiment 2 and the embodiment 1 only lies in the difference of the first installation part 210 and/or the second installation part 220, and the rest of the structures are completely the same. Therefore, the rest of the structures of embodiment 2 and the corresponding beneficial effects will not be described in detail.

Referring to FIG. 7 through FIG. 10, the first installation part 210 and/or the second installation part 220 each include: a U-shaped groove 231 with an opening facing toward corresponding one of the two insertion rods 401 and a fastener 232 matched with the opening of the U-shaped groove 231. The U-shaped groove 231 and the fastener 232 are engageable with each other to make corresponding one of the first installation part 210 and the second installation part 220 be fixed on the corresponding one of the two insertion rods 401.

In particular, two opposite sidewalls of the U-shaped groove 231 are disposed with sliding slots 2311 respectively, two ends of the fastener 232 corresponding to the sliding slots 2311 are disposed with sliding rails 2321 respectively, and the sliding slots 2311 are matched with the sliding rails 2321 to make the fastener 232 is fixed onto the U-shaped groove 231. This embodiment facilitates the installation and disassembly of the first installation part 210 and/or the second installation part 220.

Figure 9:
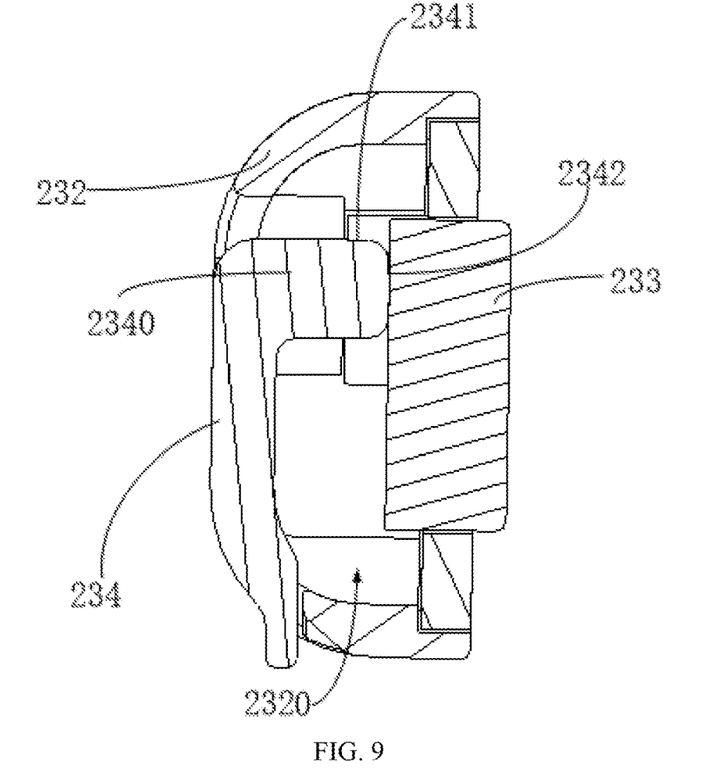
FIG. 9 is a schematic sectional view of a fastener in a locking state according to the embodiment 2 of the invention.
Figure 10:
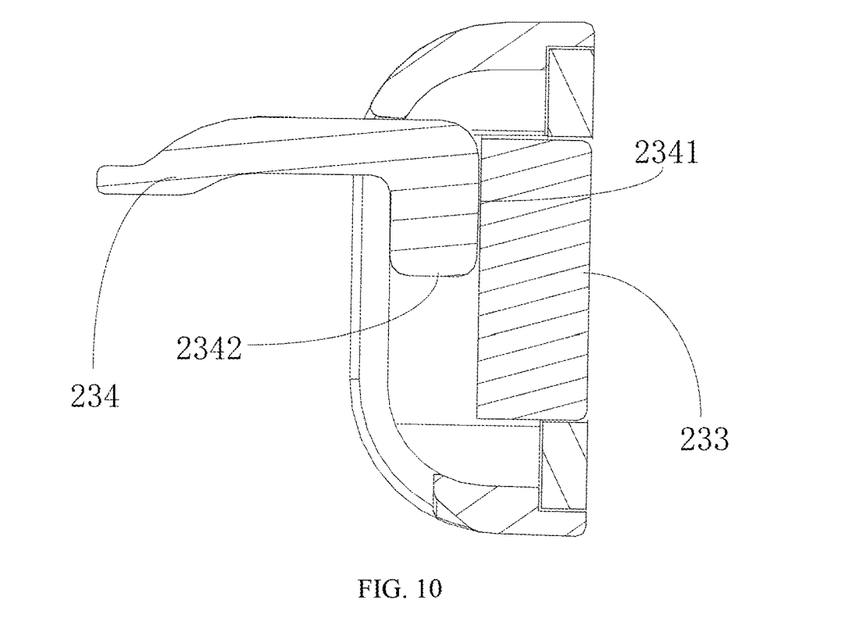
FIG. 10 is a schematic sectional view of the fastener in a unlocking state according to the embodiment 2 of the invention.

In an embodiment, the fastener 232 is disposed with a through groove 2320, and the through groove 2320 penetrates through the fastener 232. The through groove 2320 has a toggle arm 234 received therein. The toggle arm 234 is arranged on a side facing away from the U-shaped groove 231. The toggle arm 234 is hinged with a sidewall of the through groove 2320. A butting block 233 is disposed in the through groove 2320, the butting block 233 is located at a side close to the U-shaped groove 231. The butting block 233 and the through groove 2320 are movably connected with each other, so that the butting block 233 is capable of being completely received in or exposed out of the through groove 2320. An end of the toggle arm 234 adjacent to the butting block 233 is disposed with an end block 2340. The end block 2340 is a cuboid, i.e., the end block 2340 has an end surface 2341 and a side surface 2342 adjacent to the end surface 2341. As illustrated in FIG. 9, during installing, when the toggle arm 234 is received in the through groove 2320, the side surface 2342 is abutted against the butting block 233, at this time, the butting block 233 exposes out of the through groove 2320 under the squeezing of the side surface 2342, and the part of the butting block 233 exposing out of the through groove 2320 squeezes the insertion rod 401, so that the vehicle side pillow assembly is fixed on the insertion rod 401. When it needs to remove the vehicle side pillow assembly, as shown in FIG. 10, moving the toggle arm 234 to rotate till the toggle arm 234 forms a preset angle such as 90 degrees with the notch of the through groove 2320, at this time, the end surface 2341 is corresponding to the butting block 233, the butting block 233 is no longer squeezed by the toggle arm 234 and thus the butting block 233 is completely received in the through groove 2320. The butting block 233 no longer squeezes the insertion rod 401, and therefore the vehicle side pillow assembly can be removed from the insertion rod 401. This embodiment can enhance the fastening effect of the first installation part and/or the second installation part, so that the vehicle side pillow assembly can be installed more firmly and used more firmly and safely during driving.

Preferably, as shown in FIG. 11, in order to fit the first installation part 210 and/or the second installation part 220 with the insertion rods of different models of vehicles and make the first installation part 210 and/or the second installation part 220 more firmly fixed on the insertion rods, the first installation part 210 and/or the second installation part 220 is/are disposed with an insertion rod sleeve(s) 236, and the insertion rod sleeve 236 is matched with the U-shaped groove 231. In particular, an inner wall of the U-shaped groove 231 is disposed with an engagement groove 2313 (referring to FIG. 8) near an end opening of the U-shaped groove 231, the insertion rod sleeve 236 is sleeved in the U-shaped groove 231 by the engagement of the engagement protrusion 2361 with the engagement groove 2313. An inner radius of the insertion rod sleeve 236 is smaller than an inner radius of the U-shaped groove 231. In actual applications, insertion rod sleeves with different inner radii can be configured, so that the first installation part 210 and/or the second installation part 220 may be adapted to the insertion rods of different diameters. As a result, the vehicle side pillow assembly is convenient to use, flexible and universal.

Embodiment 3

Furthermore, the invention also provides an embodiment 3. The differences between the embodiment 3 and the embodiment 1 lie in the difference of the first installation part 210 and/or the second installation part 220, and the difference of the connection bar 100; and the rest of the structures are completely the same. Therefore, the rest of the structures of embodiment 3 and the corresponding beneficial effects will not be described in detail.

Figure 12:
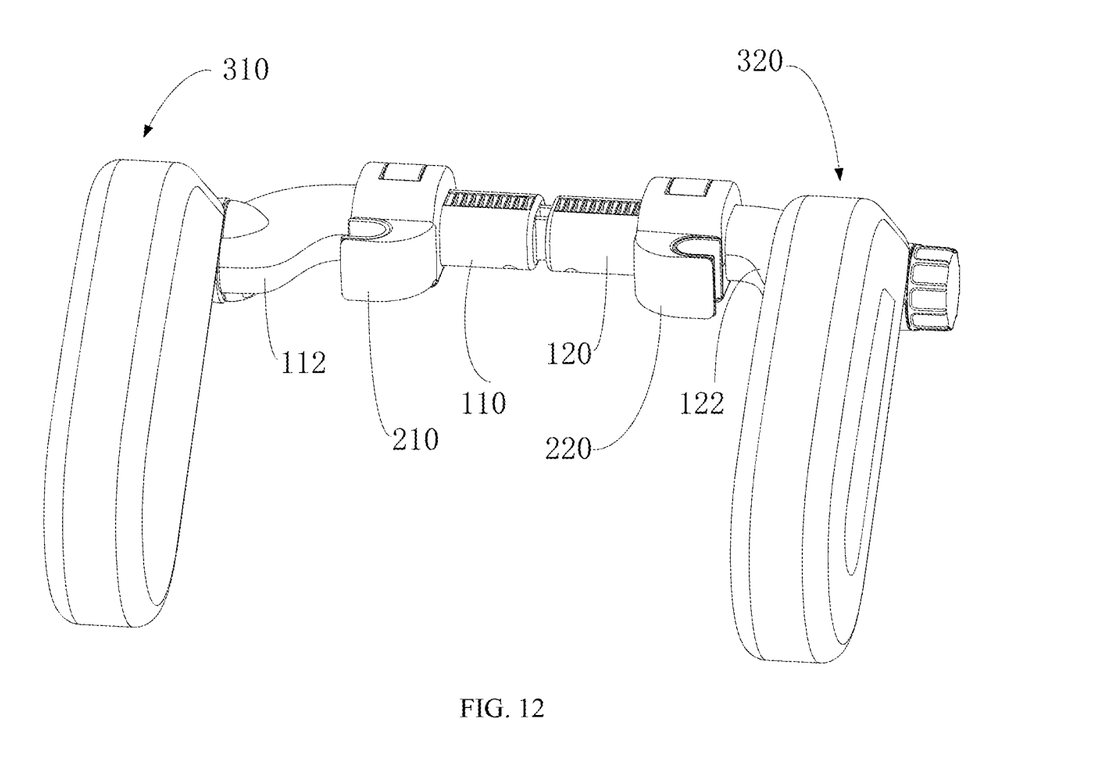
FIG. 12 is a schematic structural view of embodiment 3 of the invention.

Firstly, the first installation part 210 and/or the second installation part 220 in the embodiment 1 is/are disposed on the connection bar 100, and in use, the first installation part 210 and/or the second installation part 220, the first side pillow 310 and/or the second side pillow 320 are located at a same side of the connection bar 100. Contradistinctively, in the embodiment 3, the first installation part 210 and/or the second installation part 220, the first side pillow 310 and/or the second side pillow 320 are respectively located two sides of the connection bar 100. Compared FIG. 1 with FIG. 12, specifically, during the installation associated with the embodiment 1, the first installation part 210 and/or the second installation part 220 are installed from the front of the vehicle seat, and the connection bar 100 is installed on the front of the insertion rods 401, but during the installation associated with the embodiment 3, the first installation part 210 and/or the second installation part 220 are installed from the back of the vehicle seat, and the connection bar 100 is installed at the back/rear of the insertion rods 401.

Secondly, the connection bar 100 of the embodiment 3 further is provided with bending portions relative to the connection bar 100 of the embodiment 1. In particular, the an end of the connection bar 100 near the first side pillow 310 is disposed with a first bending portion 112, and an end of the connection bar 100 near the second side pillow 320 is disposed with a second bending portion 122. Because the connection bar 100 of the embodiment 3 is placed at the rear of the vehicle seat, the positions of the first side pillow 310 and the second side pillow 320 is shifted backwardly relative to the embodiment 1, so that the head cannot rest completely on the first pillow portion 311 or the second pillow portion 321 (Referring to FIG. 2). Therefore, it is necessary to improve the connection bar 100. The setting of the first bending portion 112 and the second bending portion 122 can make the positions of the first side pillow 310 and the second side pillow 320 move forward relatively, and can better fit the position of the head side lean, so that the structure of the embodiment 3 is more reasonable and the use is more comfortable.

Finally, it should be noted that the foregoing description merely illustrates some preferable embodiments of the invention, and is not intended to limit the scope of the invention. Any person skilled in the art can make some amendments or modifications as equivalent embodiments according to the above disclosed technical contents without departing from the technical scope of the invention. As long as they are without departing from the technical scope of the invention, any simple amendments, equivalent changes and modifications to the above embodiments according to the technical essence of the invention are still within the technical scope of the invention.

What is claimed is:
1. A vehicle side pillow assembly, comprising:
   a connection bar (100), wherein two ends of the connection bar (100) respectively are disposed with a first side pillow (310) and a second side pillow (320) having opposite pillow surfaces (402);
   a first installation part (210) and a second installation part (220), configured for installing the vehicle side pillow assembly on two insertion rods (401) of a vehicle headrest, wherein the first installation part (210) and the second installation part (220) are arranged in mirror symmetry and movably connected to the connection bar (100);
   wherein the connection bar (100) is disposed with at least two engagement slots (101) spaced from one another along an axial direction of the connection bar (100);
   wherein the first installation part (210) is disposed with a first engagement portion (211) matching the engagement slots (101) and engaged with a corresponding one of the engagement slots (101), the second installation part (220) is disposed with a second engagement portion (221) matching the engagement slots (101) and engaged with a corresponding one of the engagement slots (101), and thereby positions of the first installation part (210) and the second installation part (220) with respect to the two insertion rods (401) are fixed;

wherein the first installation part (210) and the second installation part (220) are slidably connected with the connection bar (100);

wherein the first installation part (210) comprises a first movable portion (212), and the first movable portion (212) is disposed with a first through hole (213);

wherein the second installation part (220) comprises a second movable portion (222), and the second movable portion (222) is disposed with a second through hole (223);

wherein the first movable portion (212) and the second movable portion (222) are sleeved on the connection bar (100) by the first through hole (213) and the second through hole (223) respectively.

2. The vehicle side pillow assembly as claimed in claim 1, wherein the first installation part (210) and the second installation part (220) are slidably connected with the connection bar (100).

3. The vehicle side pillow assembly as claimed in claim 2, wherein the connection bar (100) is a telescopic structure.

4. The vehicle side pillow assembly as claimed in claim 3, wherein the connection bar (100) comprises a first connecting rod (110) and a second connecting rod (120);

an end of the first connecting rod (110) facing toward the second connecting rod (120) is disposed with a fixing block (111) extending therefrom, and an end of the second connecting rod (120) facing toward the first connecting rod (110) is disposed with a guiding slot (121) matched with the fixing block (111);

a spring (122) is arranged in the guiding slot (121), and two ends of the spring (122) are respectively abutted against a sidewall of the guiding slot (121) and an end surface of the fixing block (111).

5. The vehicle side pillow assembly as claimed in claim 2, wherein the first installation part (210) comprises a first receiving groove (214) on a side facing toward the engagement slots (101), the first engagement portion (211) is received in the first receiving groove (214) and hinged with a sidewall of the first receiving groove (214), and the first engagement portion (211) is capable of being engaged with or separated from the corresponding engagement slot (101) by hinging and rotating;

the second installation part (220) comprises a second receiving groove (224) on a side facing toward the engagement slots (101), the second engagement portion (221) is received in the second receiving groove (224) and hinged with a sidewall of the second receiving groove (224).

6. The vehicle side pillow assembly as claimed in claim 1, wherein the connection bar (100) is a telescopic structure.

7. The vehicle side pillow assembly as claimed in claim 6, wherein the connection bar (100) comprises a first connecting rod (110) and a second connecting rod (120);

an end of the first connecting rod (110) facing toward the second connecting rod (120) is disposed with a fixing block (111) extending therefrom, and an end of the second connecting rod (120) facing toward the first connecting rod (110) is disposed with a guiding slot (121) matched with the fixing block (111);

a spring (122) is arranged in the guiding slot (121), and two ends of the spring (122) are respectively abutted against a sidewall of the guiding slot (121) and an end surface of the fixing block (111).

8. The vehicle side pillow assembly as claimed in claim 7, wherein a limiting block (123) is disposed at a notch of the guiding slot (121), and thereby the spring (122) is limited in the guiding slot (121).

9. The vehicle side pillow assembly as claimed in claim 7, wherein a cross section of the fixing block (111) is H-shaped.

10. The vehicle side pillow assembly as claimed in claim 1, wherein at least one of the first installation part (210) and the second installation part (220) each comprises an engagement hook (2100, 2200) with an opening facing toward a corresponding one of the two insertion rods (401), the first installation part (210) and the second installation part (220) are positioned between the two insertion rods (401).

11. The vehicle side pillow assembly as claimed in claim 1, wherein at least one of the first installation part (210) and the second installation part (220) each comprises a U-shaped groove (231) with an opening facing toward a corresponding one of the two insertion rods (401) and a fastener (232) matched with the opening of the U-shaped groove (231); the U-shaped groove (231) and the fastener (232) are engageable with each other to make corresponding one of the first installation part (210) and the second installation part (220) be fixed on the corresponding one of the two insertion rods (401).

12. The vehicle side pillow assembly as claimed in claim 11, wherein two opposite sidewalls of the U-shaped groove (231) are disposed with sliding slots (2311) respectively, two ends of the fastener (232) corresponding to the sliding slots (2311) are disposed with sliding rails (2321) respectively, and the sliding slots (2311) are matched with the sliding rails (2321).

13. The vehicle side pillow assembly as claimed in claim 12, wherein the fastener (232) is disposed with a through groove (2320) and a toggle arm (234), and the toggle arm (234) is hinged with a sidewall of the through groove (2320); an butting block (233) is disposed in the through groove (2320), the butting block (233) is located at a side close to the U-shaped groove (231) and movably arranged in the through groove (2320); the butting block (233) and the toggle arm (234) are movably connected with each other.

14. The vehicle side pillow assembly as claimed in claim 13, wherein an end of the toggle arm (234) adjacent to the butting block (233) is disposed with an end block (2340), and the end block (2340) has an end surface (2341) and a side surface (2342) adjacent to the end surface (2341);

when the end block (2340) is received in the through groove (2320), the side surface (2342) is abutted against the butting block (233);

when the toggle arm (234) and an opening of the through groove (2320) have a preset angle formed therebetween, the end surface (2341) is corresponding to the butting block (233), and the butting block (233) is not squeezed so that the butting block (233) is completely received in the through groove (2320).

15. The vehicle side pillow assembly as claimed in claim 1, wherein the first side pillow (310) and the second side pillow (320) are hinged with the connection bar (100).

16. The vehicle side pillow assembly as claimed in claim 15, wherein at least one of the first side pillow (310) and the second side pillow (320) each comprises a pillow portion (311) and a connection portion (330), and the connection portion (330) is arranged at an end of the pillow portion (311);

wherein a surface of the connection portion (330) facing toward the connection bar (100) is disposed with an annular groove (333), a sidewall of the annular groove (333) is provided with several gear slots (3331), and an end surface of the connection bar (100) is disposed with a convex portion (332) matched with the annular groove (333);

wherein the annular groove (333) is engaged with the convex portion (332).

17. The vehicle side pillow assembly as claimed in claim 16, wherein the convex portion (332) is provided with a spring sheet receiving groove (3321) having a mirror-symmetrical shape;

wherein the spring sheet receiving groove (3321) is disposed with a spring sheet therein, two ends of the spring sheet (3322) are provided with clamping portions (3324), the clamping portions (3324) are received in the spring sheet receiving groove (3321), a middle portion of the spring sheet (3322) is bent to form a protrusion (3323), and the protrusion (3323) protrudes out of an outside wall of the convex portion (332) and abuts against the gear slot (3331).

18. A vehicle side pillow assembly, comprising:

a connection bar (100), wherein two ends of the connection bar (100) respectively are disposed with a first side pillow (310) and a second side pillow (320) having opposite pillow surfaces (402);

a first installation part (210) and a second installation part (220), configured for installing the vehicle side pillow assembly on two insertion rods (401) of a vehicle headrest, wherein the first installation part (210) and the second installation part (220) are arranged in mirror symmetry and movably connected to the connection bar (100);

wherein the connection bar (100) is disposed with at least two engagement slots (101) spaced from one another along an axial direction of the connection bar (100);

wherein the first installation part (210) is disposed with a first engagement portion (211) matching the engagement slots (101) and engaged with a corresponding one of the engagement slots (101), the second installation part (220) is disposed with a second engagement portion (221) matching the engagement slots (101) and engaged with a corresponding one of the engagement slots (101), and thereby positions of the first installation part (210) and the second installation part (220) with respect to the two insertion rods (401) are fixed;

wherein at least one of the first installation part (210) and the second installation part (220) each comprises a U-shaped groove (231) with an opening facing toward a corresponding one of the two insertion rods (401) and a fastener (232) matched with the opening of the U-shaped groove (231); the U-shaped groove (231) and the fastener (232) are engageable with each other to make corresponding one of the first installation part (210) and the second installation part (220) be fixed on the corresponding one of the two insertion rods (401).

19. A vehicle side pillow assembly, comprising:

a connection bar (100), wherein two ends of the connection bar (100) respectively are disposed with a first side pillow (310) and a second side pillow (320) having opposite pillow surfaces (402);

a first installation part (210) and a second installation part (220), configured for installing the vehicle side pillow assembly on two insertion rods (401) of a vehicle headrest, wherein the first installation part (210) and the second installation part (220) are arranged in mirror symmetry and movably connected to the connection bar (100);

wherein the connection bar (100) is disposed with at least two engagement slots (101) spaced from one another along an axial direction of the connection bar (100);

wherein the first installation part (210) is disposed with a first engagement portion (211) matching the engagement slots (101) and engaged with a corresponding one of the engagement slots (101), the second installation part (220) is disposed with a second engagement portion (221) matching the engagement slots (101) and engaged with a corresponding one of the engagement slots (101), and thereby positions of the first installation part (210) and the second installation part (220) with respect to the two insertion rods (401) are fixed;

wherein the connection bar (100) comprises a first connecting rod (110) and a second connecting rod (120);

wherein an end of the first connecting rod (110) facing toward the second connecting rod (120) is disposed with a fixing block (111) extending therefrom, and an end of the second connecting rod (120) facing toward the first connecting rod (110) is disposed with a guiding slot (121) matched with the fixing block (111);

wherein a spring (122) is arranged in the guiding slot (121), and two ends of the spring (122) are respectively abutted against a sidewall of the guiding slot (121) and an end surface of the fixing block (111).

\* \* \* \* \*